US010611061B2

(12) United States Patent
Johnson et al.

(10) Patent No.: US 10,611,061 B2
(45) Date of Patent: Apr. 7, 2020

(54) METHODS FOR MANUFACTURING WIND TURBINE ROTOR BLADES

(71) Applicant: General Electric Company, Schenectady, NY (US)

(72) Inventors: Stephen Bertram Johnson, Greenville, SC (US); Xiomara Irizarry-Rosado, Greer, SC (US); Arunkumar Natarajan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 358 days.

(21) Appl. No.: 15/469,680

(22) Filed: Mar. 27, 2017

(65) Prior Publication Data

US 2018/0272572 A1   Sep. 27, 2018

(51) Int. Cl.

| | |
|---|---|
| *B29C 41/20* | (2006.01) |
| *B29C 41/00* | (2006.01) |
| *F03D 1/06* | (2006.01) |
| *B29C 70/22* | (2006.01) |
| *B29C 70/30* | (2006.01) |
| *B29D 99/00* | (2010.01) |
| *B29K 105/00* | (2006.01) |
| *B29L 31/08* | (2006.01) |

(52) U.S. Cl.
CPC ............ *B29C 41/003* (2013.01); *B29C 41/20* (2013.01); *B29C 70/22* (2013.01); *B29C 70/30* (2013.01); *B29D 99/0025* (2013.01); *F03D 1/0675* (2013.01); *B29K 2105/0032* (2013.01); *B29K 2995/0018* (2013.01); *B29L 2031/085* (2013.01); *F05B 2230/90* (2013.01); *F05B 2240/99* (2013.01); *F05B 2280/6001* (2013.01); *F05B 2280/6003* (2013.01); *F05B 2280/6011* (2013.01); *Y02E 10/721* (2013.01); *Y02P 70/523* (2015.11)

(58) Field of Classification Search
CPC combination set(s) only.
See application file for complete search history.

(56) References Cited

U.S. PATENT DOCUMENTS

| | | | |
|---|---|---|---|
| 6,797,383 | B2 | 9/2004 | Nishizawa et al. |
| 8,221,955 | B2 | 7/2012 | Victor et al. |
| 8,984,672 | B2 | 3/2015 | Arnold |
| 9,216,397 | B2 | 12/2015 | Owen et al. |
| 2011/0197320 | A1 | 8/2011 | Kweon |

(Continued)

FOREIGN PATENT DOCUMENTS

| | | |
|---|---|---|
| EP | 1560060 B1 | 8/2005 |
| WO | WO2016058097 A1 | 4/2016 |

*Primary Examiner* — George C Jin
*Assistant Examiner* — Teuta B Holbrook
(74) *Attorney, Agent, or Firm* — Dority & Manning, P.A.

(57) ABSTRACT

The present subject matter is directed to methods for manufacturing rotor blades and/or components thereof of a wind turbine. In one embodiment, the method includes forming the rotor blade component and covering at least a portion of the rotor blade component with at least one coating material. In addition, the coating material includes at least one additive having a changeable pigment. After the component is formed, the method includes inspecting the rotor blade component for defects. After inspection, the method further includes activating the additive to change the pigment from a transparent finish to a colored finish.

11 Claims, 4 Drawing Sheets

(56) References Cited

U.S. PATENT DOCUMENTS

2012/0168333 A1 7/2012 Mackay et al.
2014/0210201 A1 7/2014 Owen et al.
2015/0091564 A1 4/2015 Golan
2017/0355886 A1* 12/2017 Jung .................. C08G 59/4021

* cited by examiner

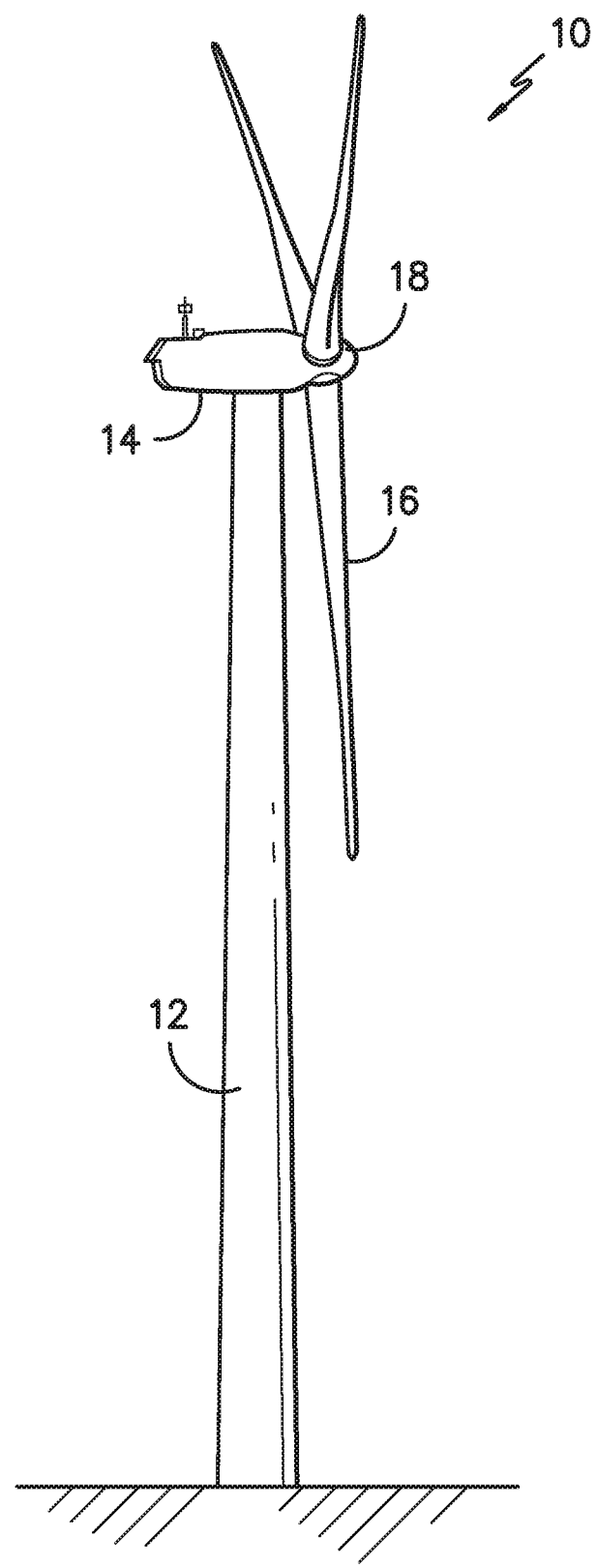
FIG. -1-

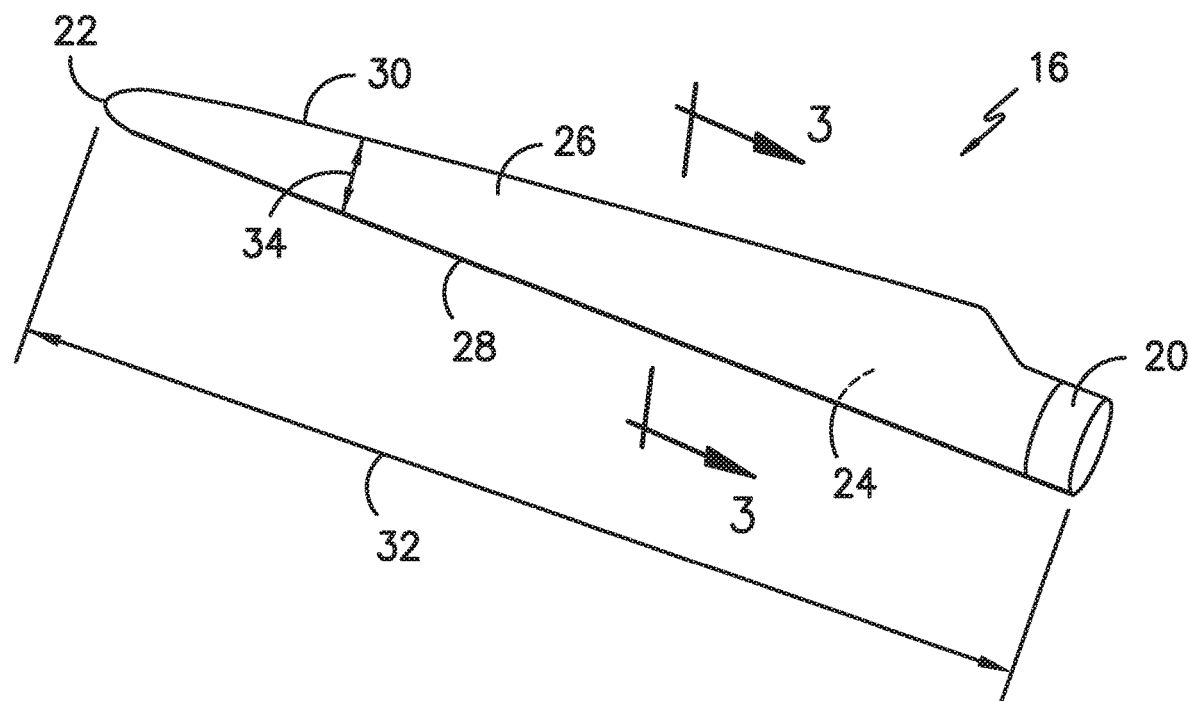
FIG. -2-
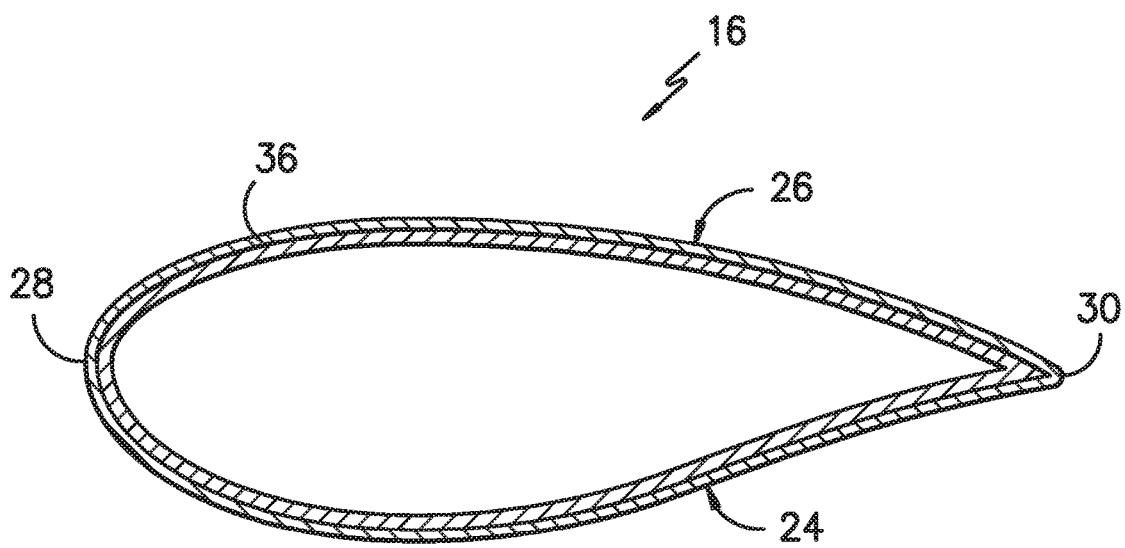
FIG. -3-

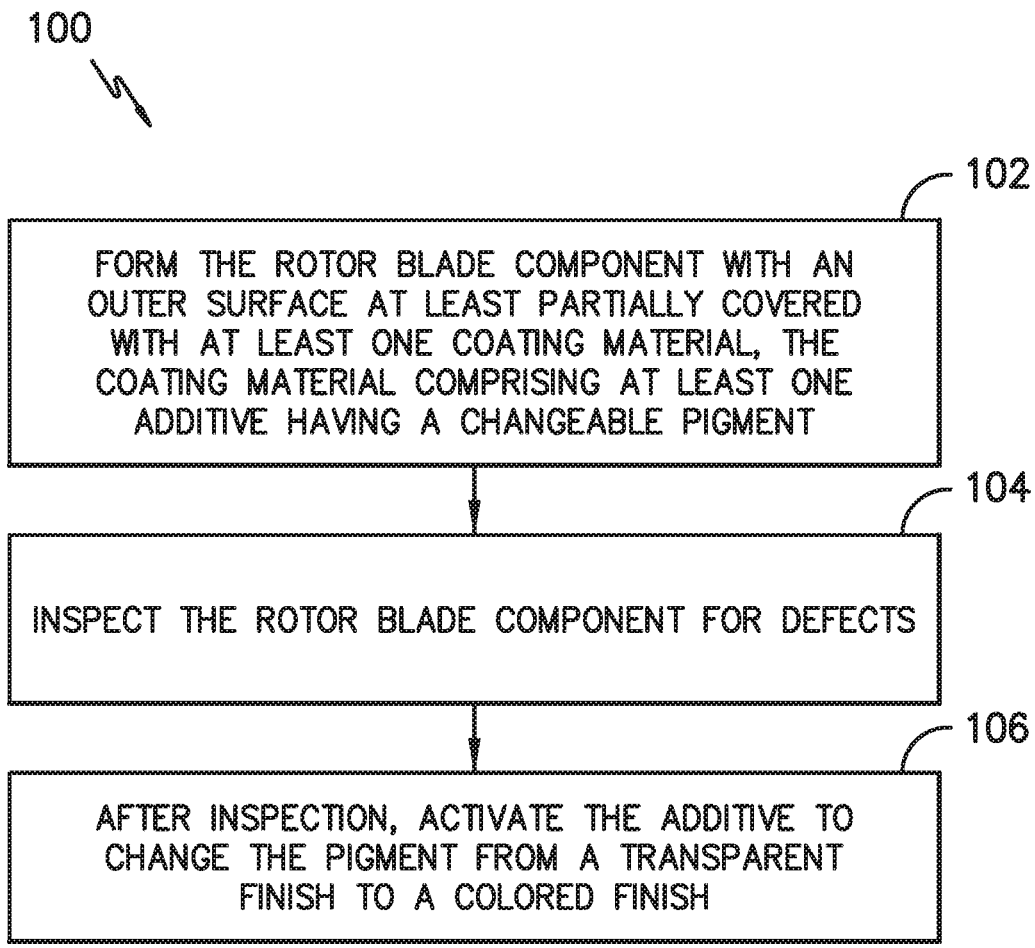
FIG. -4-

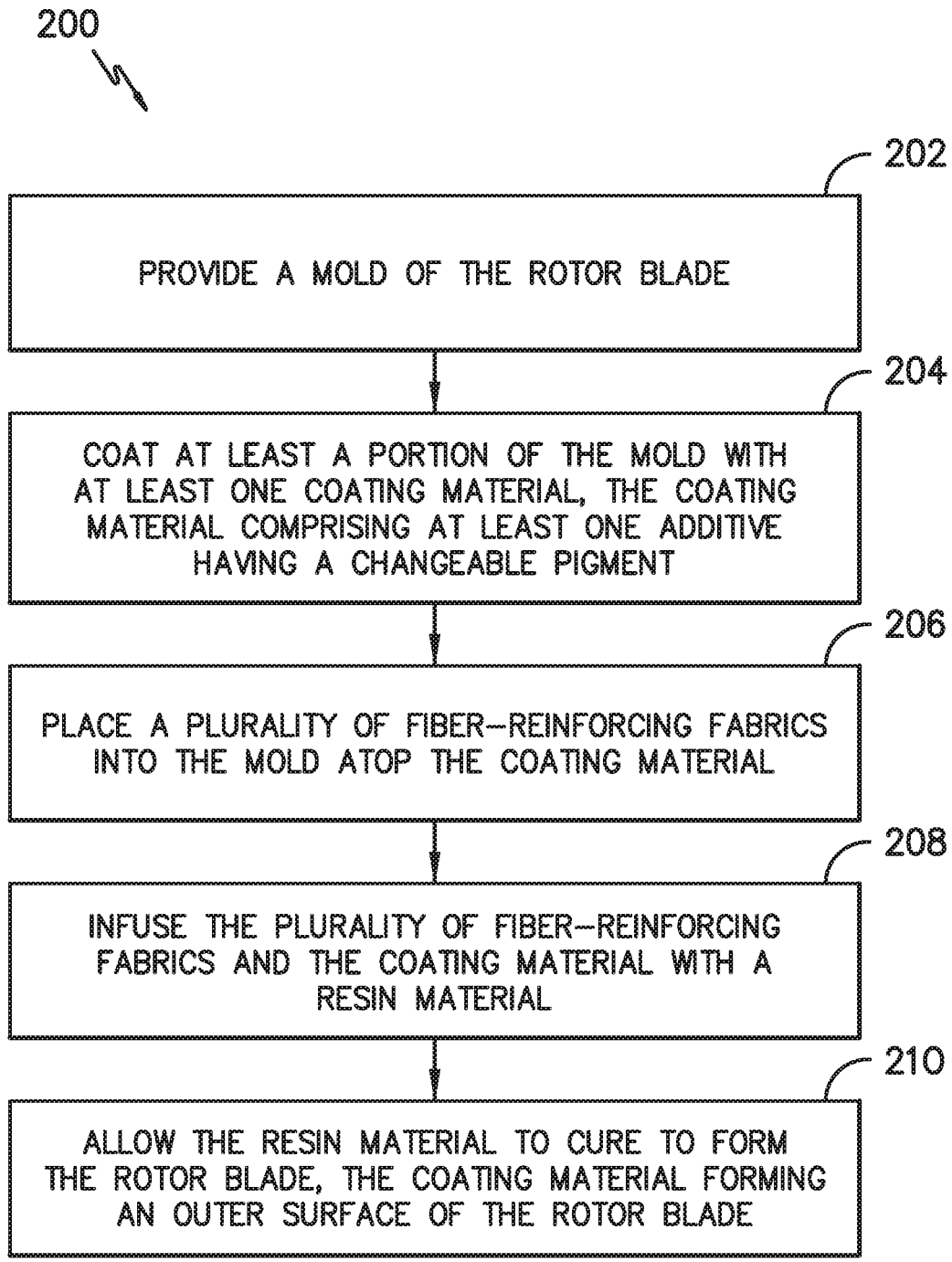
FIG. -5-

METHODS FOR MANUFACTURING WIND TURBINE ROTOR BLADES

FIELD OF THE INVENTION

The present subject matter relates generally to wind turbines and, more particularly, to methods for manufacturing wind turbine rotor blades with gel coats having a changeable pigment.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture the kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is connected to a generator for producing electricity.

The rotor blades are typically constructed of a fiberglass composite material formed using one or more molds. For example, the blade halves of a conventional rotor blade are typically formed in large molds that are custom made for the particular size and shape of the rotor blade being produced. More specifically, various rotor blades may be constructed using Resin Transfer Molding (RTM), such as Vacuum Assisted Resin Transfer Molding (VARTM). With the VARTM process, composite parts are made by placing dry fiber reinforcing fabrics and a core material into an open mold, enclosing the mold into a vacuum bag, and drawing a vacuum in order to ensure a complete preform infiltration with resin. The mold is then heated to allow the part(s) to cure. Blade halves can then be joined together to form the rotor blade.

After the rotor blade is assembled and cured, the completed blade is then typically painted. Painting the rotor blade after it has been removed from the mold allows for an inspection of the finished blade to confirm whether there are surface defects such as dry glass, porosity, or waves. In some instances, painting costs could be reduced if pigmented gel coats were used instead of paint. Such gel coats, however, make inspection of the rotor blade surface impossible.

In view of the aforementioned issues, there is a need for improved methods for manufacturing rotor blades. For example, a method for manufacturing a rotor blade using a gel coat with a changeable pigment would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for manufacturing a rotor blade component of a wind turbine. The method includes forming the rotor blade component with an outer surface at least partially covered with at least one coating material. More specifically, the coating material includes at least one additive having a changeable pigment. The method also includes inspecting the rotor blade component for defects. After inspection, the method further includes activating the additive to change the pigment from a transparent finish to a colored finish.

In one embodiment, the coating material may be a gel coat. In another embodiment, the additive may include a thermochromic dye, a photochromic dye, an electrochromic additive, or any other suitable additives having a changeable pigment. More specifically, in certain embodiments, the electrochromic additive may include a polymer dispersive liquid crystal, nano-crystals, micro-blinds, organic electrochromic components, or similar.

In further embodiments, the step of forming the rotor blade component with the outer surface at least partially covered with the at least one coating material may include providing a mold of the rotor blade component, coating at least a portion of the mold with the coating material, placing a plurality of fiber-reinforcing fabrics into the mold atop the coating material, infusing the plurality of fiber-reinforcing fabrics and the coating material with a resin material, allowing the resin material to cure to form the rotor blade component. Alternatively, the step of forming the rotor blade component with the outer surface at least partially covered with the at least one coating material may include spraying the rotor blade component with the coating material, painting the rotor blade component with the coating material, or any other suitable application methods.

In additional embodiments, the step of activating the additive to change the pigment from the transparent finish to the colored finish may include applying heat, voltage, and/or ultraviolet light to the additive to change the pigment from the transparent finish to the colored finish.

In several embodiments, the additive may be reversible. Thus, in such embodiments, the method may also include reactivating the additive at a later time, e.g. during a maintenance procedure, to change the pigment from the colored finish back to the transparent finish such that one or more areas of the rotor blade component can be seen. In alternative embodiments, the additive may be irreversible.

In particular embodiments, the rotor blade component may include any component, including but not limited to a blade shell, a spar cap, a shear web, or a root ring.

In another aspect, the present subject matter is directed to a rotor blade component of a wind turbine. The rotor blade component includes a body defining an exterior surface thereof. In addition, the rotor blade includes an outer coating material covering at least a portion of the exterior surface of the body. More specifically, the coating material may include at least one additive having a changeable pigment. As such, the changeable pigment configured to change between a transparent finish to a colored finish. It should be further understood that the rotor blade may also include any of the additional features as described herein.

In yet another aspect, the present subject matter is directed to a method for manufacturing a rotor blade of a wind turbine. The method includes providing a mold of the rotor blade. Further, the method includes coating at least a portion of the mold with at least one coating material, the coating material comprising at least one additive having a changeable pigment. In addition, the method includes placing a plurality of fiber-reinforcing fabrics into the mold atop the coating material. In addition, the method includes infusing the plurality of fiber-reinforcing fabrics and the coating material with a resin material, the coating material forming an outer surface of the rotor blade. It should be further understood that the method may also include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade according to the present disclosure;

FIG. 3 illustrates a flow diagram of one embodiment of a method for manufacturing a rotor blade component according to the present disclosure;

FIG. 4 illustrates a flow diagram of one embodiment of a method for manufacturing a rotor blade according to the present disclosure; and FIG. 5 illustrates a flow diagram of another embodiment of a method for manufacturing a rotor blade according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing rotor blades and/or components thereof of a wind turbine. In one embodiment, the method includes forming the rotor blade component with an outer coating material that includes at least one additive having a changeable pigment. Thus, after the component is formed, the rotor blade component can be inspected for defects while the coating material has a transparent finish. After inspection, the additive may be activated to change the pigment from the transparent finish to a colored finish.

Rotor blades manufactured according to the methods described herein provide many advantages not present in the cited art. For example, the coating material/gel coat on the exterior of the rotor blade allows the blade to change pigments effectively eliminating the step of painting the rotor blade, thereby saving time and money. In addition, at least some of the additives described herein may be reversible, meaning that the pigment of the gel coat can be easily changed between the transparent finish and the colored finish. As such, the additives can be altered between the transparent finish and the colored finish at a time after initial manufacturing, which allows certain areas of the rotor blade to be easily inspected, e.g. for maintenance purposes, by reverting back to the transparent finish. This unique ability is not possible with painted rotor blades.

Referring to the drawings, FIG. 1 illustrates perspective view of a wind turbine 10 of conventional construction. As shown, the wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the wind turbine 10 of FIG. 1 is provided for illustrative purposes only to place the present invention in an exemplary field of use. Thus, one of ordinary skill in the art should understand that the invention is not limited to any particular type of wind turbine configuration.

Referring now to FIG. 2, there is illustrated a perspective view of a rotor blade 16 of conventional construction. As shown, the rotor blade 16 includes a blade root 20 configured for mounting the rotor blade 16 to a mounting flange (not shown) of the wind turbine hub 18 (FIG. 1) and a blade tip 22 disposed opposite the blade root 20. The rotor blade 16 may also include a pressure side 24 and a suction side 26 extending between a leading edge 28 and a trailing edge 30. Additionally, the rotor blade 16 may include a span 32 defining the total length between the blade root 20 and the blade tip 22 and a chord 34 defining the total length between the leading edge 28 and the trailing edge 30. As is generally understood, the chord 34 may vary in length with respect to the span 32 as the rotor blade 16 extends from the blade root 20 to the blade tip 22.

Additionally, the rotor blade 16 may define any suitable aerodynamic profile. Thus, in several embodiments, the rotor blade 16 may define an airfoil shaped cross-section. For example, the rotor blade 16 may be configured as a symmetrical airfoil or a cambered airfoil. Further, the rotor blade 16 may also be aeroelastically tailored. Aeroelastic tailoring of the rotor blade 16 may entail bending the blade 16 in a generally chordwise direction and/or in a generally spanwise direction. The chordwise direction generally corresponds to a direction parallel to the chord 34 defined between the leading and trailing edges 28, 30 of the rotor blade 16. Additionally, the spanwise direction generally corresponds to a direction parallel to the span 32 of the rotor blade 16.

As indicated above, the present subject matter is generally directed to methods for manufacturing rotor blade components for the wind turbine 10 and also rotor blade components produced in accordance with such methods. For example, in particular embodiments, the rotor blade components described herein may include a blade shell, a spar cap, a shear web, or a root ring. In addition, the rotor blade components may include any other suitable components in addition to those listed above. Accordingly, one embodiment of a method 100 for manufacturing a rotor blade component will generally be described with reference to FIG. 4 and will be explained in greater detail with reference to FIGS. 2 and 3. As shown at 102, the method 100 includes forming the rotor blade component, i.e. the rotor blade 16 with an outer surface thereof at least partially covered with a coating material 36. For example, in certain embodiments, the rotor blade component may be formed using any suitable process, including but not limited to injection molding, three-dimensional (3-D) printing, two-dimensional (2-D) pultrusion, 3-D pultrusion, thermoforming, vacuum forming, pressure forming, bladder forming, automated fiber deposition, automated fiber tape deposition, or vacuum infusion.

In addition, the coating material/gel coat 36 includes at least one additive having a changeable pigment or color. For example, in one embodiment, the blade mold may be coated with the coating material 36 as a first step in the blade making process. For example, in one embodiment, the method 100 may include providing a mold of the rotor blade component, coating at least a portion of the mold with the coating material 36, placing a plurality of fiber-reinforcing fabrics into the mold atop the coating material 36, infusing the plurality of fiber-reinforcing fabrics and the coating material 36, with a resin material, and allowing the resin material to cure to form the rotor blade component.

In another embodiment, the rotor blade component may be covered with the coating material 36 by painting the rotor blade component with the coating material 36 and/or spraying the rotor blade component with the coating material 36 as well as any other suitable application methods. As shown at 104, after the component is formed, the method 100 includes inspecting the rotor blade component for defects. After inspection, as shown at 106, the method 100 further includes activating the additive to change the pigment from a transparent finish to a colored finish. More specifically, in certain embodiments, the additive(s) may be activated (i.e. changed from a transparent finish to a colored finish) by applying heat, voltage, and/or ultraviolet light.

The coating material(s) 36 described herein may include a gel coat. For example, in several embodiments, the gel coat may include thermosetting polymers based on epoxy or unsaturated polyester resin chemistry. As such, the coating material 36 is configured to provide a high-quality finish on the exterior surface of the rotor blade component, e.g. the rotor blade 16. In addition, the additive(s) described herein may include a thermochromic dye, a photochromic dye, an electrochromic additive, or any other suitable additives having a changeable pigment. In addition, the additive may be reversible or irreversible in nature. Thus, in embodiments having reversible additives, the method 100 may also include reactivating the additive at a later time, e.g. during a maintenance procedure, to change the pigment from the colored finish back to the transparent finish.

More specifically, in one embodiment, the additive may be an irreversible thermochromic dye that changes from a transparent or clear finish to a colored finish by applying heat. For such additives, at a particular temperature, color will start to appear in the gel coat and unchanged at all other temperatures. For example, in certain embodiments, the temperature change points may include 65 degrees-Celsius (° C.), 80° C., 100° C., and 130° C. As such, the start of the color change to full color development may be about +/−5° C.

Alternatively, the additive may be a reversible thermochromic dye that changes from a colored finish to a transparent or clear finish by applying heat. In such embodiments, at a particular temperature, the color will start to disappear in the gel coat for inspection, and then will return to its original color after heat application is removed and the temperature is restored below a certain temperature. In such embodiments, the temperature change points may include 40° C., 65° C., 80° C., 100° C., and 130° C., with the start of the color change to full color development being about +/−5° C.

In further embodiments, the additive may include photochromic dye that changes from a transparent or clear finish to a colored finish. For such additives, ultraviolet (UV) irradiation with a predetermined wavelength of light (e.g. from about 200 nanometers (nm) to about 350 nm) causes the color change.

In certain embodiments, the aforementioned dyes may include leuco dyes, which generally refers to dyes than can switch between two chemical forms, one of which is colorless. In addition, the dyes can be applied to the formulation/gel coat as a powder, slurry, or a solvent or water-based ink. Suitable leuco dyes include, but are not limited to, aminotriarylmethanes, fluorans, phthalides, aminoxanthenes, aminothioxanthenes, aminophenoxazines, aminophenothiazines, aminodihydro-phenazines, aminodiphenyl methanes, aminohydrocinnamic acids (cyanoethanes, leuco methines) and corresponding esters, amino acridines, imidazoles, indanones, leuco indamines, hydrozines, and amino-2,3-dihydroanthraquinones.

In yet another embodiment, as mentioned, the additive may include an electrochromic additive. For example, in one embodiment, the electrochromic additive may include polymer dispersive liquid crystals (PDLCs). In polymer dispersed liquid crystal devices (PDLCs), liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. Typically, the liquid mix of polymer and liquid crystals is placed between two layers of glass or plastic that includes a thin layer of a transparent, conductive material followed by curing of the polymer. As such, PDLCs are infusible films that can be applied on the blade or any other component during manufacturing. In further embodiments, the electrochromic additive may include nano-crystals, micro-blinds, organic electrochromic components, or similar. For example, in one embodiment, the organic electrochromic components may include methyl viologen, polythiophenes, or any other suitable organic electrochromic components.

For electrochromic additives, voltage can be applied to change the pigment thereof. For example, for PDLCs, connectors or bus bars may be secured at the edges thereof and connected to a voltage source to change the color from color to semi-transparent. In certain embodiments, this process may be reversible. As such, the voltage source allows the change to be used when needed. For example, when the rotor blade component is manufactured, the component can be inspected while the gel coat is still clear. Voltage can then be applied to obtain the desired colored finish of the component. After some period of operational time, the gel coat may return to its clear finish, e.g. via the voltage source, for periodic maintenance. Such additives can be useful for inspecting particularly sensitive areas of the rotor blades, including e.g. mechanical joints, reinforcements, and/or electrical junctions.

Referring now to FIG. 5, a flow diagram of one embodiment of a method for manufacturing a rotor blade according to the present disclosure is illustrated. As shown at 202, the method 200 includes providing a mold of the rotor blade 16. For example, the mold can be any suitable mold having any desired shape to achieve a rotor blade as described herein. In addition, the mold may be a single mold or a mold having multiple pieces, such as two halves. Further, as shown at 204, the method 200 includes coating at least a portion of the mold with at least one coating material (e.g. the coating material 36 illustrated in FIG. 3. More specifically, as mentioned, the coating material 36 includes at least one additive having a changeable pigment. As shown at 206, the method 200 includes placing a plurality of fiber-reinforcing fabrics into the mold atop the coating material 36. As shown at 208, the method 200 includes infusing the plurality of fiber-reinforcing fabrics and the coating material with a resin material, e.g. a thermoset material or a thermoplastic material. As shown at 210, the method 200 includes allowing the resin material to cure to form the rotor blade 16, wherein the coating material 36 forms an outer surface of the rotor blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a rotor blade component of a wind turbine, the method comprising:
    forming the rotor blade component with an outer surface at least partially covered with at least one coating material, the coating material comprising at least one additive having a changeable pigment;
    inspecting the rotor blade component for defects; and,
    after inspection, activating the additive to change the pigment from a transparent finish to a colored finish.

2. The method of claim 1, wherein the coating material comprises a gel coat.

3. The method of claim 1, wherein the additive comprises at least one of a thermochromic dye, a photochromic dye, or an electrochromic additive.

4. The method of claim 3, wherein the electrochromic additive comprises at least one of a polymer dispersive liquid crystal, nano-crystals, organic electrochromic components, or micro-blinds.

5. The method of claim 1, wherein forming the rotor blade component with the outer surface at least partially covered with the at least one coating material further comprises:
    providing a mold of the rotor blade component;
    coating at least a portion of the mold with the coating material;
    placing a plurality of fiber-reinforcing fabrics into the mold atop the coating material;
    infusing the plurality of fiber-reinforcing fabrics and the coating material with a resin material; and,
    allowing the resin material to cure to form the rotor blade component.

6. The method of claim 1, wherein forming the rotor blade component with the outer surface at least partially covered with the at least one coating material further comprises at least one of spraying or painting the rotor blade component with the coating material.

7. The method of claim 1, wherein activating the additive to change the pigment from the transparent finish to the colored finish further comprises applying at least one of heat, voltage, or ultraviolet light to the additive to change the pigment from the transparent finish to the colored finish.

8. The method of claim 1, wherein the at least one additive is reversible.

9. The method of claim 8, further comprising reactivating the additive at a later time to change the pigment from the colored finish back to the transparent finish.

10. The method of claim 1, wherein the at least one additive is irreversible.

11. The method of claim 1, wherein the rotor blade component comprises at least one of a blade shell, a spar cap, a shear web, or a root ring.

* * * * *